UNITED STATES PATENT OFFICE.

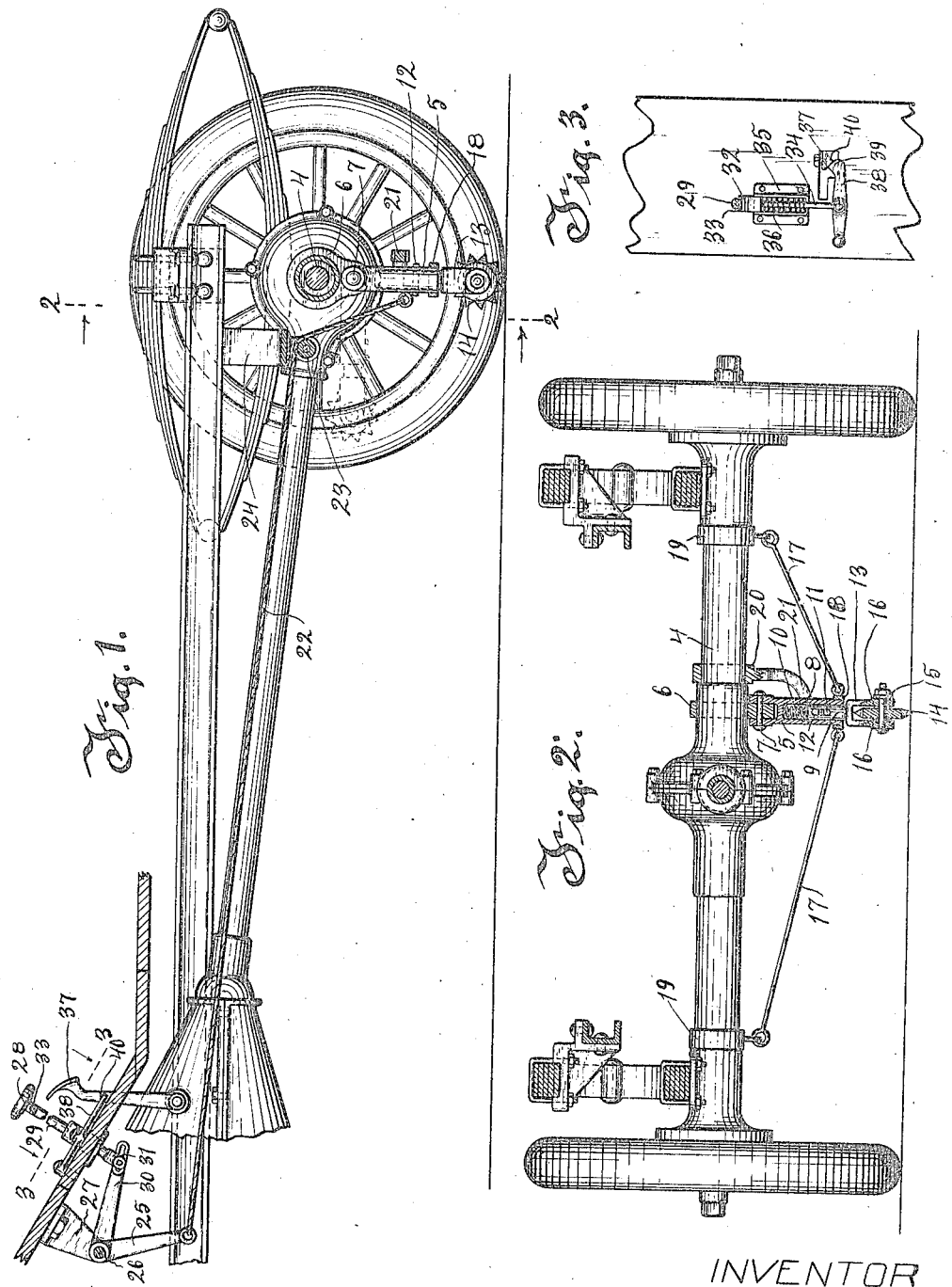

CHARLES H. BECKER, OF MILWAUKEE, WISCONSIN.

ANTISKIDDING DEVICE.

1,148,281.   Specification of Letters Patent.   Patented July 27, 1915.

Application filed January 25, 1915. Serial No. 4,135.

*To all whom it may concern:*

Be it known that I, CHARLES H. BECKER, a citizen of the United States, and resident of Milwaukee, in the county of Milwaukee and State of Wisconsin, have invented new and useful Improvements in Antiskidding Devices, of which the following is a description, reference being had to the accompanying drawings, which are a part of this specification.

The invention relates to anti-skidding devices for automobiles.

The invention designs more particularly to provide an anti-skidding device in the nature of an emergency brake which may be thrown into engagement with the roadway over which the vehicle is running to prevent skidding of the vehicle.

The invention further designs to provide an anti-skidding device the control of which is arranged adjacent the usual foot brake on the automobile and which is operated simultaneously with the application of the foot brake.
In view of the fact that the control mechanism of the anti-skidding device is operatively connected with the foot pedal of the usual brake, the device will operate on the application of the brake and at a time when it is most needed for it is well-known that there is a greater tendency of the automobile to skid when the brake is applied. Thus there is a decided advantage in having the anti-skidding brake released with the application of the automobile brake.

The invention further designs to provide an anti-skidding device which is operated by the foot-pedal of the usual foot brake and which may be rendered inoperative by removing the actuating means on the brake.

The invention further designs to provide an anti-skidding device comprising a toothed contacting shoe which is swingingly supported upon the vehicle and which is adapted to be brought into engagement with the road over which the vehicle is running to prevent skidding of the vehicle, said shoe on being thrown into operative position contacting with the road and preventing sidewise movement of the vehicle.

The invention further designs to provide an anti-skidding device which is thrown in operable position by the foot pedal of the usual foot brake on the automobile and which is returned to inoperative position by the operation of a foot pedal adjacent said brake.

The invention further designs to provide a new and improved form of anti-skidding device.
The invention consists in the several features hereinafter set forth and more particularly defined by claims at the conclusion hereof.

In the drawings: Figure 1 is an elevation view of the device showing it applied to an automobile (parts being shown in section); Fig. 2 is a section taken on the line 2—2 of Fig. 1; Fig. 3 is a section taken on the line 3—3 of Fig. 1.
The anti-skidding device is shown applied to the rear axle 4 of the automobile between the rear wheels, though it will be understood it may be applied at any suitable place beneath the automobile and be mounted on a suitable supporting bracket secured to the frame of the automobile.

The device comprises a swinging brake and means for throwing said brake into or out of operative position. This brake comprises a carrying member 5 which is swingingly secured to a collar 6 mounted upon the axle 4 by a bolt 7. The member 5 has a bore 8 therein in which a plunger 9 is slidably mounted and a spring 10 is disposed within the bore 8 and interposed between the end of the bore and the end of the plunger 9. The end of the plunger 9 within the bore is provided with a slot 11 and a pin 12 passes through this slot and is secured in the member 5. This pin and slot connection prevents rotary movement of the plunger with respect to the carrying member. The lower end 13 of the plunger 9 is bifurcated and a brake-shoe, such as a star wheel 14, is pivotally mounted upon a bolt 15 passing through it and the bifurcations and is disposed between the bifurcations. Friction washers 16 mounted on the bolt are interposed between the sides of the star wheel and each bifurcation. The star wheel 15 is so secured to the plunger that the force necessary to overcome the frictional resistance of the star wheel will be greater than the force necessary to overcome the force exerted by the spring 10 against the plunger 9.

The swinging member is held in proper position laterally of the axle by link rods 17 which are secured at one of their ends to a coller 18 mounted on the carrying member 5 and at their other ends to collars 19 mounted on the axle 4 and bracket 20, mounted on the axle 4, is provided with a depending arm 21 forming a stop for limiting movement of the swinging brake in one direction.

The means for throwing the swinging brake into or out of operative position comprises a flexible connection 22 connected at one end to the carrying member 5, passing over a guide 23 mounted on a bracket 24 secured to the frame of the machine, and connected at its other end to a bell crank lever 25 pivotally mounted on a shaft 26 carried by a bracket 27 secured to the foot board of the machine, and means for operating said bell crank lever and flexible connection.

The means for operating the bell crank lever 25 comprises means for swinging the bell crank lever to move the flexible connection and thereby move the swinging brake up into inoperative position, means for locking said bell crank operating means when said swinging member is in inoperative position and means for releasing said locking means to permit the free movement of the bell crank lever and flexible connection to allow the swinging brake to descend by gravity to contact with the roadway.

The means for swinging the brake up into inoperative position comprises a foot pedal 28, the stem 29 of which is slidably mounted in the foot-board, the lower end of the stem being connected with the arm 30 of the bell crank by a pin and slot connection 31. Downward pressure upon the pedal 28 will oscillate the bell crank to cause it to move the flexible connection 22 forwardly and thus raise the brake up into inoperative position.

The means for locking the bell crank operating means to secure the brake in inoperative position comprises means for locking the foot-pedal 28 in lower position which consists of a latch 32 adapted to engage a notch 33 in the foot-pedal 28, said latch being connected to a rod 34 slidably mounted in a box 35, a spring 36 being interposed between the latch and one end of the box 35.

The means for releasing the locking means above described comprises means for moving the latch 32 from engagement with the foot pedal 28, said means being operated by the foot lever or pedal 37 of the usual foot brake. This means consists of a lever 38 pivotally mounted upon the foot-board and pivotally connected intermediate its ends to the rod 34. The free end 39 of the lever 38 is adapted to contact with a lug 40 removably secured to the brake pedal 37.

The operation of the device is as follows:—When the operator presses down on the brake pedal 37 the lug 40 on said brake engages the free end 39 of the lever 38 causing said lever to move outwardly and thereby moving the rod 34 and latch 32 outwardly against the action of the spring 36, thus moving the latch out of locking engagement with the foot pedal 28. Under these conditions the pedal 28 and bell crank 26 and flexible connection 22 being free to move, the weight of the brake will carry it down and bring it in engagement with the roadway. As soon as the shoe or star wheel 14 strikes the roadway the forward movement of the automobile will cause the brake to walk under the machine. At this time, the brake-shoe, due to its contact with the pavement, will exert an upward force against the action of the spring 10. The star wheel under these conditions will not revolve until the force exerted upon it becomes greater than the force exerted by the spring 10 upon the plunger 9, owing to the frictional engagement of the washers 16 with the star wheel. The brake is thus brought to a vertical position and is prevented from rearwardly moving out of this position by the stop 21. The brake shoe when brought to this position is held in contact with the roadway by the spring 10 and has a tendency to, and depending upon the character of the road, does dig into the roadway. When the brake shoe or star wheel is thus engaged with the roadway the lateral movement of the automobile, due to skidding, will be prevented. When it is desired to lift the brake out of the roadway and throw it into inoperative position, the operator presses down on the foot pedal 28 thus turning the bell crank lever downwardly, which through the flexible connection 22 will lift the brake upwardly and swing it into a position beneath the automobile, in which inoperative position it is held by the spring pressed latch 32 engaging the notch 33 in the pedal 28. If it is desired to dispense with the use of the anti-skidding device, the lug 40 on the foot brake 37 is removed therefrom thus permitting the foot brake to perform its functions in the usual manner and preventing its action upon the lever 38 which is used to lift the latch 32. The invention thus exemplifies a swinging brake for contacting with the roadway to prevent an automobile from skidding.

The invention is not to be restricted to the details of construction herein set forth, but may be varied so as to be within the scope of the appended claims.

What I claim as my invention is:—

1. The combination, with an automobile and the brake-pedal of its usual foot-brake, of an anti-skidding device comprising a brake for contacting with the roadway, means for moving said brake into inoperative position, means for retaining said brake in inoperative position, and means operated by the brake-pedal for releasing said retaining means to permit the brake to operate.

2. The combination, with an automobile and the brake-pedal of its usual foot brake, of an anti-skidding device comprising a gravity-actuated swinging member mounted on the automobile, a brake-shoe movably carried by said member, a resilient connection between said member and brake-shoe, means for moving said device into inoperative position, means for retaining said device in inoperative position, and means controlled by the brake pedal for releasing said retaining means to permit said brake to operate.

3. The combination, with an automobile and the brake pedal of an automobile, of an anti-skidding device comprising a gravity actuated carrying member swingingly mounted on the automobile, a plunger slidably mounted in said member, a resilient connection between said member and plunger, a brake shoe movably secured to said plunger, means for moving said device into inoperative position, means for retaining said device in inoperative position, and removable means on said foot brake and operable therewith for releasing said retaining means to permit said device to operate.

4. The combination, with an automobile and the brake pedal thereof, of an anti-skidding device comprising a gravity actuated carrying member swingingly mounted on the automobile, a plunger slidably mounted in said member, a resilient connection between said member and plunger, a star wheel rotatably mounted on the plunger, means for moving said device into inoperative position, means for retaining said device in inoperative position, and means removably secured to the foot brake and operable therewith for releasing said retaining means to permit said device to operate.

5. The combination, with an automobile and the brake-pedal of its usual foot-brake, of an anti-skidding device comprising a gravity-actuated carrying member swingingly mounted on the automobile, a brake-shoe movably carried by said member, a lever pivotally secured to the automobile adjacent the dash-board thereof, a connection between said lever and said member, a foot-pedal operatively connected to said lever for moving said device into inoperative position, means for locking said foot-pedal to retain said device in inoperative position, and means secured to the brake-pedal and operable therewith for releasing said locking means to permit said device to operate.

6. The combination, with an automobile and the brake-pedal of its usual foot-brake, of an anti-skidding device comprising a gravity-actuated carrying member swingingly mounted on the automobile, a brake-shoe movably carried by said member a lever pivotally secured to the automobile adjacent the dash-board thereof, a flexible connection between said lever and said member, a foot-pedal operatively connected to said lever for moving said device into inoperative position, a spring-pressed latch mounted on the dash-board for locking said foot-pedal to retain said device in inoperative position, and means on the brake-pedal for engaging said latch to release it from engagement with the foot-pedal to permit said device to operate.

In testimony whereof, I affix my signature, in presence of two witnesses.

CHARLES H. BECKER.

Witnesses:
 Louis O. French,
 F. M. Bonchard.